(12) United States Patent
Giers et al.

(10) Patent No.: US 6,851,764 B2
(45) Date of Patent: Feb. 8, 2005

(54) METHOD AND CONTROL SYSTEM FOR CONTROLLING AN ELECTRONICALLY REGULATED BRAKE ACTUATING SYSTEM

(75) Inventors: Bernhard Giers, Frankfurt (DE); Robert Schmidt, Rennerod (DE); Jürgen Böhm, Oberneisen (DE); Thorsten Ullrich, Gernsheim (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/381,561

(22) PCT Filed: Sep. 26, 2001

(86) PCT No.: PCT/EP01/11162
§ 371 (c)(1),
(2), (4) Date: Mar. 27, 2003

(87) PCT Pub. No.: WO02/26540
PCT Pub. Date: Apr. 4, 2002

(65) Prior Publication Data
US 2004/0080208 A1 Apr. 29, 2004

(30) Foreign Application Priority Data

Sep. 27, 2000 (DE) ......................................... 100 49 150
Aug. 28, 2001 (DE) ......................................... 101 42 040

(51) Int. Cl.⁷ ............................................... B60T 8/42
(52) U.S. Cl. .......................... 303/115.2; 303/3; 303/15
(58) Field of Search ............................... 303/155, 163, 303/164, 113.1, 150, 153, 119.3, 119.1, 115.2, 3, 15, 113.5

(56) References Cited

U.S. PATENT DOCUMENTS

| | | | | |
|---|---|---|---|---|
| 4,690,465 A | * | 9/1987 | Takeda et al. | 303/119.3 |
| 5,566,703 A | | 10/1996 | Watanabe et al. | |
| 6,161,906 A | * | 12/2000 | Sakane et al. | 303/150 |
| 6,347,842 B1 | * | 2/2002 | Isono | 303/114.1 |
| 6,386,647 B2 | * | 5/2002 | Oishi et al. | 303/114.1 |

FOREIGN PATENT DOCUMENTS

| | | | |
|---|---|---|---|
| DE | 4428929 | 2/1996 | |
| DE | 19707960 | 9/1998 | |
| DE | 19848960 | 4/2000 | |
| EP | 0982207 | 3/2000 | |
| EP | 1055576 | 11/2000 | |
| WO | WO 9503196 A1 * | 2/1995 | ............. B60T/7/12 |

* cited by examiner

Primary Examiner—Robert A. Siconolfi
Assistant Examiner—Melanie Torres
(74) Attorney, Agent, or Firm—Honigman Miller Schwartz and Cohn LLP (57) ABSTRACT

The invention discloses methods and control systems for controlling an electronically controllable brake actuating system for automotive vehicles, with a depressurized pressure medium supply reservoir, with at least one pressure source which can be controlled by an electronic control unit. The pressure source is used to apply pressure to the wheel brakes of the vehicle, with pressure sensors and pressure control valves being associated with the wheel brakes. The pressure control valves are controllable in an analog manner by means of an electric variable in dependence on the differential pressure applied to them.

33 Claims, 6 Drawing Sheets

METHOD AND CONTROL SYSTEM FOR CONTROLLING AN ELECTRONICALLY REGULATED BRAKE ACTUATING SYSTEM

TECHNICAL FIELD

The present invention relates to a method for controlling an electronically controllable brake actuating system for automotive vehicles.

BACKGROUND OF THE INVENTION

A brake actuating system of this type is disclosed in EP 0 832 019 B1. The pressure control valves allocated to the wheel brakes in the prior art brake actuating system are configured as valves of a seat valve construction, arranged in pairs and being actuatable in an electromagnetic analog manner, and the inlet valves inserted in the connection between the pressure source and the wheel brakes are designed as normally closed seat valves that perform a pressure-limiting function in their closed switch position, while the outlet valves inserted in the connection between the wheel brakes and the pressure medium supply reservoir are designed as normally open valves that open the connection in their open switch position and shut it off in their closed switch position.

However, the above-mentioned publication does not indicate any measures that permit adapting the actuation characteristic curve of the pressure control valves to manufacture spread and aging effects as well as to changing environmental conditions.

BRIEF SUMMARY OF THE INVENTION

Therefore, an object of the present invention is to disclose methods of actuating an electronically controllable brake actuating system of the type initially mentioned as well as regulating systems that safeguard the constant quality of pressure control by permitting a reliable adaptation of the actuation characteristic curve of the pressure control valves to disturbing effects impairing the valves' proper functioning.

This object is achieved according to a first method in that the electric variable in the pressure control valve (inlet valve; outlet valve) to be identified is slowly varied in the pressure maintenance phase until a noticeable pressure variation takes place in the wheel brake associated with said pressure control valve, whereupon the dependence of the electric variable on the differential pressure is corrected.

To render the idea of the invention more specific, it is arranged for that the pressure control valves (inlet valve; outlet valve) are designed as valves that are closed in their inactive condition, and that the variation of the electric actuating variable is an increase based on a value that is below the value necessary for opening of the pressure control valve (inlet valve; outlet valve).

Another alternative involves that the pressure control valves (outlet valves) used for pressure reduction are designed as valves that are open in their inactive condition, and that the variation of the electric actuation variable is a decrease based on a value that is above the value necessary for retaining the pressure control valve (outlet valve) in the closed condition.

It is especially appropriate that the variation of the electric variable occurs in defined driving situations, e.g. during vehicle standstill, in a defined range of vehicle speed, at a low variation speed of a wheel pressure nominal value, or a minimum duration of the pressure maintenance phase. The variation of the electric actuation variable is discontinued when the difference between nominal pressure and actual pressure leaves a predetermined tolerance range having limits that are fixed in dependence on the vehicle speed.

In another favorable feature of the present invention, the pressure control valves are designed as electromagnetically controllable valves and the electric variable is an electric current being supplied to the electromagnetic drive, or the pressure control valves are configured as piezoelectrically controllable valves and the electric variable is an electric voltage being supplied to the piezoelectric drive.

In a favorable aspect of the idea of the invention, the pressure variation in the wheel brake associated with the pressure control valve during the variation of the electric variable is observed cyclically in a time window, and the maximum or minimum pressure value is detected in each case which, in turn, is taken into account for determining a detection threshold for the pressure change at the outlet or inlet of the pressure control valve used for pressure increase or pressure reduction.

With a pressure control valve used for pressure increase, a detection threshold E in the window i is preferably defined according to the formula $$E = \text{Max}(p)|\text{window } (i-1) + \epsilon,$$

where $\epsilon$ is a process parameter taking into account valve leakage and malfunctions of the pressure sensor sensing the pressure variation.

Opening of the pressure control valve (inlet valve) is inferred when the pressure value at the outlet of the pressure control valve exceeds the detection threshold at a time $t_{detect}$.

In contrast thereto, with a pressure control valve used for pressure reduction, a detection threshold E in the window i is defined according to the formula $$E = \text{Max}(p)|\text{window } (i-1) - \epsilon,$$

where $\epsilon$ is a process parameter taking into account valve leakage and malfunctions of the pressure sensor sensing the pressure variation.

Opening of the pressure control valve (outlet valve) is inferred when the pressure value at the inlet of the pressure control valve drops below the detection threshold at a time $t_{detect}$.

In a favorable improvement of the method of the present invention, at time ($t_{detect}$), when the pressure value at the outlet of the pressure control valve (inlet valve) used for pressure increase or at the inlet of the pressure control valve (outlet valve) used for pressure reduction exceeds or falls below the threshold valve, a point of time is calculated according to the formula $$t_{react} = t_{detect} - \tau$$

where $\tau$ designates the offset in time between the reaction of the pressure control valve caused by the actuation and the detection of this reaction by way of the change in pressure.

The offset in time is preferably determined in dependence on a signal characterizing the viscosity of the pressure medium.

According to another favorable feature of the invention, the correction of the dependence of the actuating current $I(\Delta p)$ on the differential pressure ($\Delta p$) is especially effected in electromagnetically controllable valves according to the formula $$I(\Delta p)^{new} = I(\Delta p)^{old} \cdot (1-\lambda) + \lambda \cdot I_{react},$$

where $I_{react}$ designates the actuating current value corresponding to the change in pressure in the wheel brake associated with the pressure control valve at time ($t_{react}$), $I(\Delta p)^{old}$ designates the value of the dependence of the actuating current $I_o(\Delta p)$ on the differential pressure ($\Delta p$) in the present operating point ($\Delta p$) before the correction (adaption) is carried out, and $I(\Delta p)^{new}$ designates the value of the dependence of the actuating current $I_o(\Delta p)$ on the differential pressure ($\Delta p$) after the correction (adaption) is carried out. The adaption rate $\lambda$ should then be selected from the interval (0, 1].

In piezoelectrically controllable valves the correction of the dependence of the voltage $U_o(\Delta p)$ being applied on the differential pressure ($\Delta p$) is carried out according to the formula $$U(\Delta p)^{new} = U(\Delta p)^{old} \cdot (1-\lambda) + \lambda \cdot U_{react},$$

where $U_{react}$ designates the actuating voltage value corresponding to the change in pressure in the wheel brake associated with the pressure control valve at time ($t_{react}$), $U(\Delta p)^{old}$ designates the value of the dependence of the actuating voltage $U(\Delta p)$ on the differential pressure ($\Delta p$) in the present operating point ($\Delta p$) before the correction (adaption) is carried out, and $U(\Delta p)^{new}$ designates the value of the dependence of the actuating voltage $U(\Delta p)$ on the differential pressure ($\Delta p$) after the correction (adaption) is carried out, and the adaption rate $\lambda$ shall be selected from the interval (0, 1].

According to a second method, the objective presented hereinabove is achieved because the frequency of the actuation processes of the pressure control valve (inlet valve; outlet valve) is determined and taken into consideration according to a nominal pressure variation to be controlled in the wheel brake for the correction or reduction of the dependence of the electric variable on the differential pressure. This method, which is limited only to the reduction of the actuation characteristic curve, may also be used out of pressure maintenance phases.

It is especially appropriate in this arrangement that the number of the actuation processes of the pressure control valve (outlet valve) used for pressure reduction is determined, with the nominal pressure variation rising or being constant, and an excessive actuation of the pressure control valve (inlet valve) used for pressure increase is inferred from the exceeding of a threshold value, or when the number of the actuation processes of the pressure control valve (inlet valve) used for pressure increase is determined, with the nominal pressure variation falling or being constant, and that an excessive actuation of the pressure control valve (outlet valve) used for pressure reduction is inferred from the exceeding of a threshold value.

According to another favorable feature of the invention, the number found ($N_{red}$, $N_{incr}$) is compared to a maximum allowed numerical value ($N_{red}^*$, $N_{incr}^*$) that is produced according to the formula $$N_{red}^* = f_B \cdot T_{incr} \text{ or } N_{incr}^* = f_B \cdot T_{red}$$

where $f_B$ is a maximum allowed actuation frequency, and $T_{inc}$, $T_{red}$ designate the duration of the phase of rise or fall of the nominal pressure variation. An excessive actuation of the pressure control valve (inlet valve, outlet valve) used for pressure increase or reduction is inferred from the exceeding of the maximum allowed numerical value ($N_{red}^*$, $N_{incr}^*$).

Further favorable features of the second method of the invention can be taken from sub claims 26 to 29.

A control system of the invention for implementing the methods mentioned hereinabove is characterized in that there is provision of a pressure controller to which are sent, as input quantities, a nominal pressure value that shall be applied to one of the wheel brakes of the vehicle, an actual pressure value that is applied to one of the wheel brakes of the vehicle, as well as the hydraulic differential pressure value prevailing at the pressure control valve under review and having an output quantity that is the nominal value of the electric variable used to actuate the pressure control valve, and that there is provision of means for the correction (adaption) of the dependence on the electric variable on the differential pressure value.

Further, it is especially favorable that the pressure controller comprises a linear controller, a pilot control module, and a correction module, and the deviation produced from the nominal pressure value and actual pressure value is sent to the linear controller as an input quantity, while a signal representative of the hydraulic differential pressure prevailing at the pressure control valve under review is sent to the pilot control module, with said pilot control module generating a pilot control value of the electric variable used to actuate the pressure control valve that corresponds to the opening point of the pressure control valve and is added to the output quantity of the linear controller for producing the nominal value of the electric variable used to actuate the pressure control valve, and with the actual pressure value and the differential pressure being sent as input quantities to the correction module, and its output quantity ($K_1,K_2$) influencing the performance of the pilot control module.

The output quantity ($K_1$) of the correction module is preferably defined as a difference:

$$K_1 = I(\Delta p)^{new} - I(\Delta p)^{old}$$

or $$K_1 = U(\Delta p)^{new} - U(\Delta p)^{old}$$

where $I(\Delta p)^{old}$ or $U(\Delta p)^{old}$ designate the value of the dependence of the electric actuation variable $I(\Delta p)$ or $U(\Delta p)$ on the differential pressure ($\Delta p$) in the present operating point ($\Delta p$) before the correction (adaption) is carried out, and $I(\Delta p)^{new}$ or $U(\Delta p)^{new}$ designate the value of the dependence of the electric actuation variable $I(\Delta p)$ or $U(\Delta p)$ on the differential pressure ($\Delta p$) after the correction (adaption) is carried out.

Finally, it is arranged for in a control system for implementing the second method of the invention that the nominal pressure value ($P_{nom}$) is additionally sent as an input quantity to the correction module, and that its output quantity $K_2 = -\Delta T$ is derived from the comparison of the determined number of the actuation processes ($N_{red}$, $N_{incr}$) with a maximum allowed numerical value ($N_{red}^*$, $N_{incr}^*$), and the dependence of the electric variable is reduced when the maximum allowed numerical value ($N_{red}^*$, $N_{incr}^*$) is exceeded.

DETAILED DESCRIPTION OF THE PREFFERED EMBODIMENTS

Figure 1:
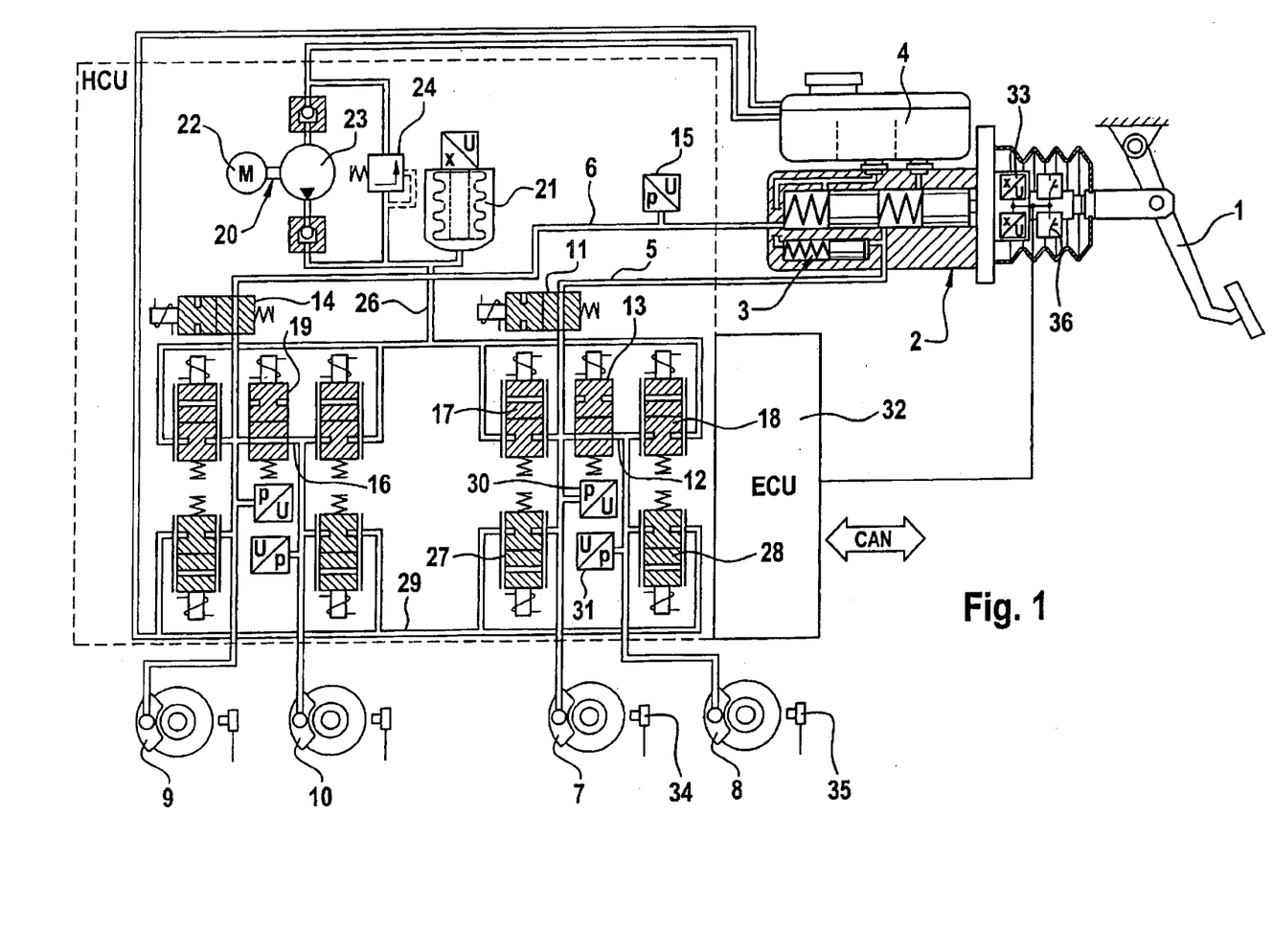
FIG. 1 is a simplified wiring diagram of a brake actuating system wherein the method of the invention can be implemented.

The electronically controllable brake actuating system illustrated in FIG. 1 is composed of a dual-circuit master brake cylinder or tandem master cylinder 2, operable by means of an actuating pedal 1 and interacting with a pedal travel simulator 31, as well as having two isolated pressure chambers connected to a depressurized pressure medium supply reservoir 4. Connected to the first pressure chamber (primary pressure chamber) by way of a closable first hydraulic line 5 are wheel brakes 7, 8 e.g. associated with the front axle. The line 5 is closed by means of a first separating valve 11, while an electromagnetically operable, preferably normally open (NO) pressure compensation valve 13 is inserted in a line portion 12 interposed between the wheel brakes 7,8 and allows a braking pressure control on each individual wheel in case of need.

The second pressure chamber of the master brake cylinder 2, to which a pressure sensor 15 may be connected, is connectable to the other pair of wheel brakes 9, 10 associated with the rear axle by means of a second hydraulic line 6 that can be closed by means of a second separating valve 14. Again an electromagnetically operable, normally open (NO) pressure compensation valve 19 is inserted into a line portion 16 disposed between the wheel brakes 9, 10. Since the design of the hydraulic circuit connected to the second pressure chamber of the master brake cylinder 2 is identical to the brake, circuit 11 explained in the above description, it need not be explained in the following text.

As can further be taken from the drawings, there is provision of a motor-and-pump assembly 20 with a high-pressure accumulator 21, serving as an independent pressure source and being in turn comprised of a pump 23 driven by means of an electric motor 22 and a pressure limiting valve 24 connected in parallel to pump 23. The suction side of pump 23 is connected to the above-mentioned pressure medium reservoir 4 by way of a pressure-limiting valve 24. The hydraulic pressure generated by the pump 23 is monitored by a pressure sensor (not shown) or determined by estimation.

A third hydraulic line 26 connects the high-pressure accumulator 21 with the inlet ports of two normally closed two-way/two-position directional control valves 17, 18 actuatable electromagnetically in an analog manner and preceding, as inlet valves, the wheel brakes 7 and 8. Besides, the wheel brakes 7, 8 are connected to a fourth hydraulic line 29 by way of each one normally closed two-way/two-position directional control valve or outlet valve 27, 28 that can be actuated electromagnetically in an analog manner, said line 29 being connected to the depressurized pressure medium supply reservoir 4, on the other hand. The hydraulic pressure prevailing in wheel brakes 7, 8 is determined with the aid of each one pressure sensor 30, 31.

For the joint actuation of the motor-and-pump assembly 20 and of the electromagnetic valves 11, 13, 14, 17, 18, 19, 27, 28 an electronic control unit 32 is used to which are sent, as input signals, the output signals of an actuating travel sensor 33 cooperating with the actuating pedal 1 and of the above-mentioned pressure sensor 15, said signals rendering it possible to detect the driver's deceleration wish. However, other means, for example, a force sensor sensing the actuating force at the actuating pedal 1, may also be used for the detection of the driver's deceleration wish. As further input quantities, the output signals of the pressure sensors 30, 31 as well the output signals representative of the speed of the vehicle from wheel sensors (shown only schematically) are sent as further input quantities to the electronic control unit 32, with the wheel sensors associated with the wheel brakes 7, 8 being designated by reference numerals 34, 35.

It is generally known that the electric variable used for the actuation of the above-mentioned inlet valves 17, 18 and outlet valves 27, 28, meaning the electric current in the embodiment shown, is dependent on the hydraulic differential pressure applied to the pressure control valve that shall be identified, said pressure being referred to by $\Delta p$ in the following text.

Figure 2:
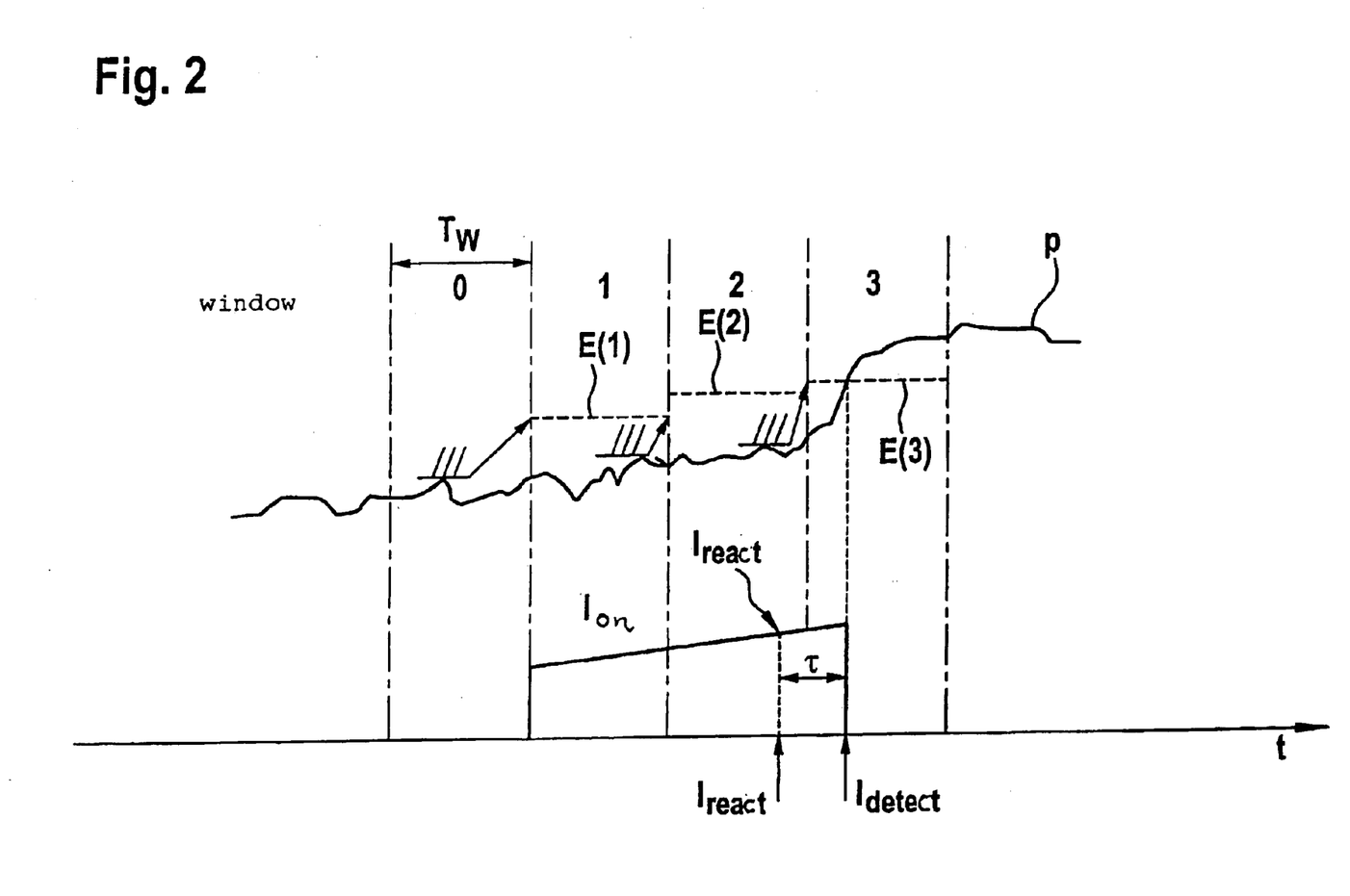
FIG. 2 is a diagram illustrating the wheel brake pressure variation for determining a threshold value for an electromagnetically operable pressure control valve used for pressure increase.

The methods according to the invention are used to adapt the dependence between the electric current and the differential pressure, the so-called actuation characteristic curve of the pressure control valves, to disturbing effects such as manufacture spread and aging effects as well as changing environmental conditions, and implementation of the methods is explained in the following text with reference to FIGS. 2 to 6. It must be taken into consideration that the first method is applicable only during the so-called pressure maintenance phase where all of the pressure control valves 17, 18, 27, 28 are closed or become closed. It is assumed that, as has been described hereinabove, all pressure control valves 17, 18, 27, 28 are configured as normally closed two-way/two-position directional control valves which are actuatable in an analog manner by means of an electromagnetic drive. Accordingly, the actuation characteristic curve of the valves, i.e., the dependence of the electric current being supplied to the electromagnetic drive on the hydraulic differential pressure $\Delta p$ applied to the inlet valve 17, 18 or outlet valve 27, 28 (which dependence is stored in the above-mentioned electronic control unit 32) is corrected or adapted as follows:

For each pressure control valve to be identified, such as inlet valve 17 (FIG. 1), the pressure variation p(t) in the wheel brake 7 associated with this inlet valve 17 is monitored cyclically in a time window $T_w$ (cf. FIG. 2) by means of pressure sensor 30, and the maximum signal value is respectively determined in this interval. A process parameter $\epsilon$ is added to the maximum value determined, said parameter taking into account a leakage that may occur at valve 17 as well as malfunctions of the pressure sensor 30. This permits defining threshold values $E_1, E_2, E_3 \ldots$ in the individual time windows i (i=0, 1, 2, 3, ...) according to the following formula:

$$E = \text{Max}(p)|\text{window } (i-1) + \epsilon$$

It shall now be assumed that at time $t_0$ (cf. FIG. 2) a defined driving situation (e.g. vehicle standstill) occurs and a pressure maintenance phase ($\Delta p=0$) is detected. At this time the electromagnetic drive of the inlet valve 17 is energized and the current $I_{on}$ slowly increased, with the pressure variation being compared with the above-mentioned determined threshold value $E_1, E_2, E_3 \ldots$ in each time window 1, 2, 3, ... When the threshold value $E_3$ (in time window 3) is exceeded during actuation of the inlet valve 17 at time $t_{detect}$, a change in pressure is identified and the actuation characteristic curve is corrected for the present operating point $\Delta p$. The actuating current value $I_{react}$ adjusted at time $t_{react}=t_{detect}-\tau$ is taken into account as a correction value, said value $\tau$ indicating the expected reaction time of the system made up of inlet valve/wheel brake. If the temperature of the hydraulic components is sensed, the dependence on temperature of the reaction time may be taken into consideration. The actuation characteristic curve I ($\Delta$p) is corrected by way of the value of the actuating current $I_{react}$ adjusted at time $t_{react}$ preferably according to an adaption regulation in the form $$I(\Delta p)^{new}=I(\Delta p)^{old}\cdot(1-\lambda)+\lambda\cdot I_{react},$$

and the adaption rate $\lambda$ should be chosen from the interval (0, 1]. Low values $\lambda$ cause a greater insensitivity to wrong measurements, values $\lambda$ near 1 cause a quicker adaption of the stored actuation characteristic curve to the valve performance observed. In the formulation of the adaption regulation $I(\Delta p)^{old}$ designates the value of the actuation characteristic curve $I(\Delta p)$ in the present operating point $\Delta p$ before the adaption is performed, while $I(\Delta p)^{new}$ refers to the value after the adaption.

Figure 3:
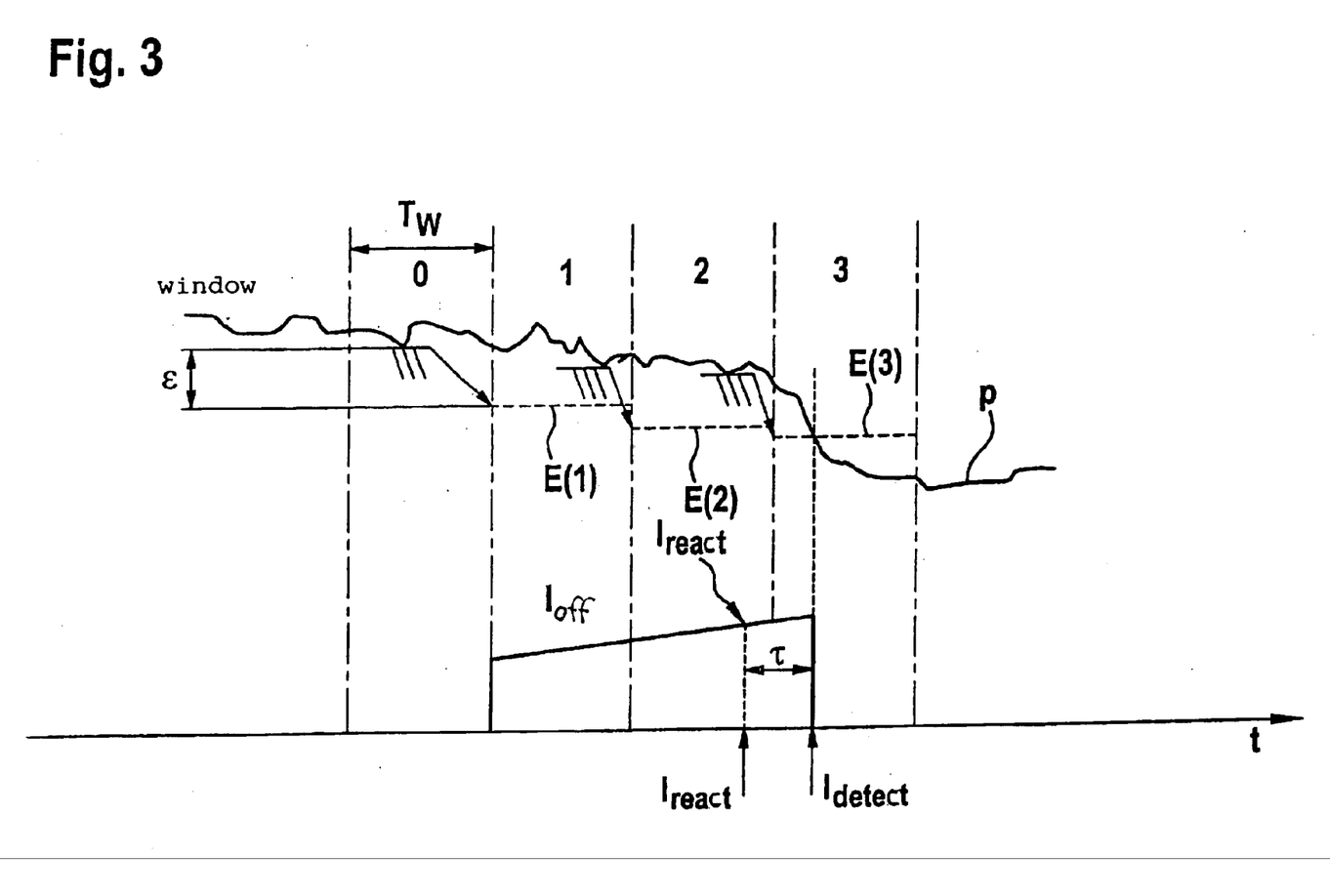
FIG. 3 is a diagram illustrating the wheel brake pressure variation for determining a threshold value for an electromagnetically operable pressure control valve used for pressure reduction.

The invention method was described in connection with an inlet valve used for pressure increase and operated by means of an electromagnetic drive actuatable by electric current. The described process may, however, also be used with respect to an electromagnetically operable outlet valve used for pressure reduction. A corresponding simplified illustration is shown in FIG. 3. The method can also be used in an analog manner in pressure control valves that are driven by means of a piezoelectric drive. In this case the quantity influencing the actual performance of the piezoelectric valves is the voltage that is to be applied to the piezoelectric drive.

The second method of the invention basically involves lowering the actuation characteristic curve when the control circuit has a performance that is stable at the limits. The method described is used to detect conditions of the pressure control circuit stable at the limits which are caused by an actuation characteristic curve $I(\Delta p)$ or $U(\Delta p)$. Said method may also be used out of the above-mentioned pressure maintenance phase. The term 'limit stability' herein refers to a frequent alternation of actuation processes of the inlet and outlet valves at a constant, monotonously rising or monotonously falling nominal pressure. This behavior is connected to a wheel brake pressure that swings around the nominal pressure value.

The detection of the situation described and the allocation for actuating the inlet and outlet valve is based on the following fundamental idea:

The frequency of the outlet valve actuation processes at rising or constant nominal pressure value is an indicator of an excessive actuation of the inlet valve, while the frequency of the inlet valve actuation processes at falling or constant nominal pressure value is an indicator of an excessive actuation of the outlet valve. To utilize these correlations, phases of pressure increase and decrease within the nominal pressure variation are classified by way of the time variation thereof, and the duration of the pressure increase phase is referred to by $T_{incr}$ and the duration of the pressure reduction phase is referred to by $T_{red}$.

The number ($N_{red}$) of the actuation processes of the outlet valve 27, 28 serving for pressure reduction is determined during a pressure increase phase ($T_{incr}$). Accordingly, the number ($N_{incr}$) of the actuation processes of the inlet valve 17, 18 serving for pressure increase is determined during a pressure reduction phase ($T_{red}$).

At the end of the respective phase the determined number $N_{red}$ or $N_{incr}$ of the actuation processes is compared with a maximum allowed numerical value ($N_{red}{}^*, N_{incr}{}^*$), to which the following equations apply:

$$N_{red}{}^*=f_B\cdot T_{incr} \text{ and } N_{incr}{}^*=f_B\cdot T_{red},$$

where $f_B$ designates a maximum allowed actuation frequency. The parameterizable actuation frequency $f_B$ considers the fact that a certain number of overswings or underswings will have to be expected, even with an ideal configuration of the pressure controller.

When the determined number $N_{red}$, $N_{incr}$ of the actuation processes is above the maximum allowed numerical value $N_{red}{}^*, N_{incr}{}^*$, this is explained by an excessive actuation of the inlet valve 17, 18 or outlet valve 27, 28 serving for pressure increase or pressure reduction.

When the algorithm described detects a limit stability of the pressure control circuit caused by an excessive actuation of an inlet or outlet valve, the actuation characteristic curve $I(\Delta p)$ memorized for the respective valve in the electronic control unit 32 is performed according to the following adaption regulation:

$$I(\Delta p)^{new}=I(\Delta p)^{old}-\Delta I.$$

The pilot control characteristic curve is thus reduced by a predefined amount $\Delta I$. $I(\Delta p)^{old}$ refers to the value of the characteristic curve I ($\Delta p$) in the present operating point $\Delta p$ before the execution of the adaption, while $I(\Delta p)^{new}$ designates the value after the adaption.

Figure 4:
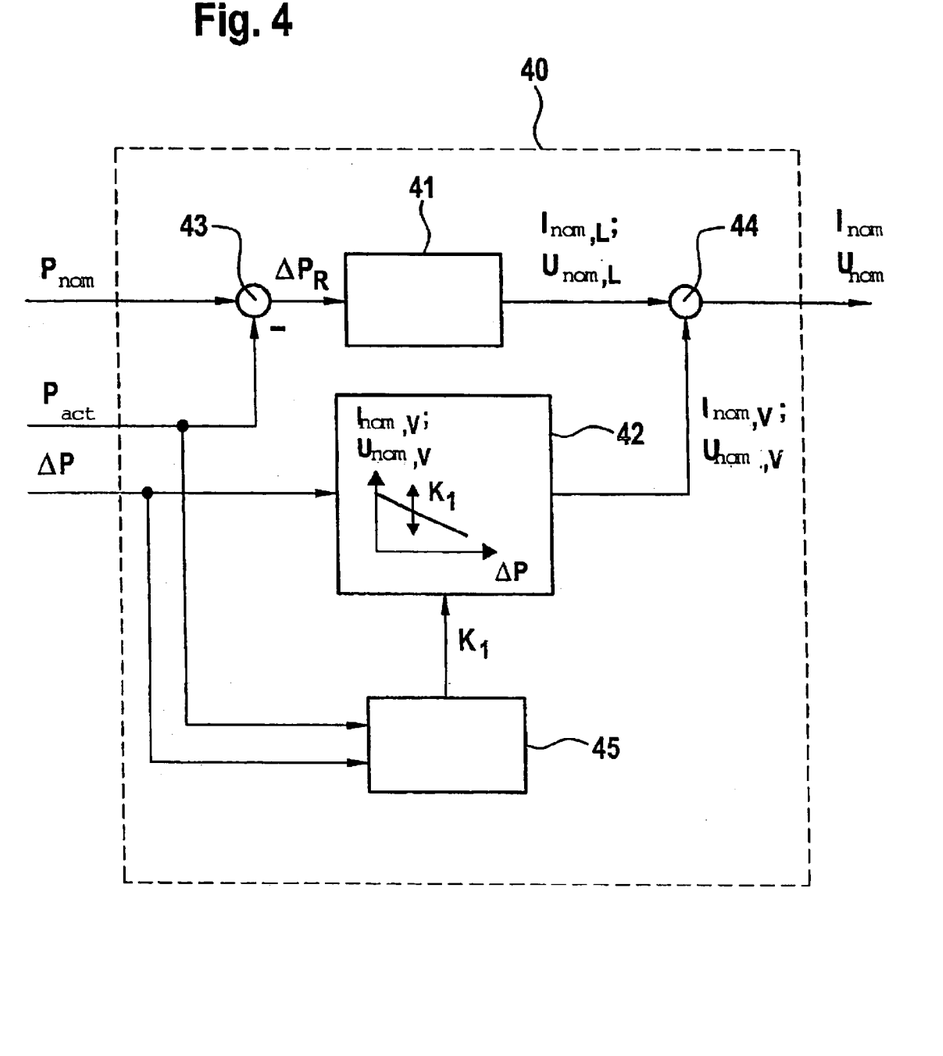
FIG. 4 shows the design of a pressure controller for implementing the first mentioned method of the invention.
Figure 5:
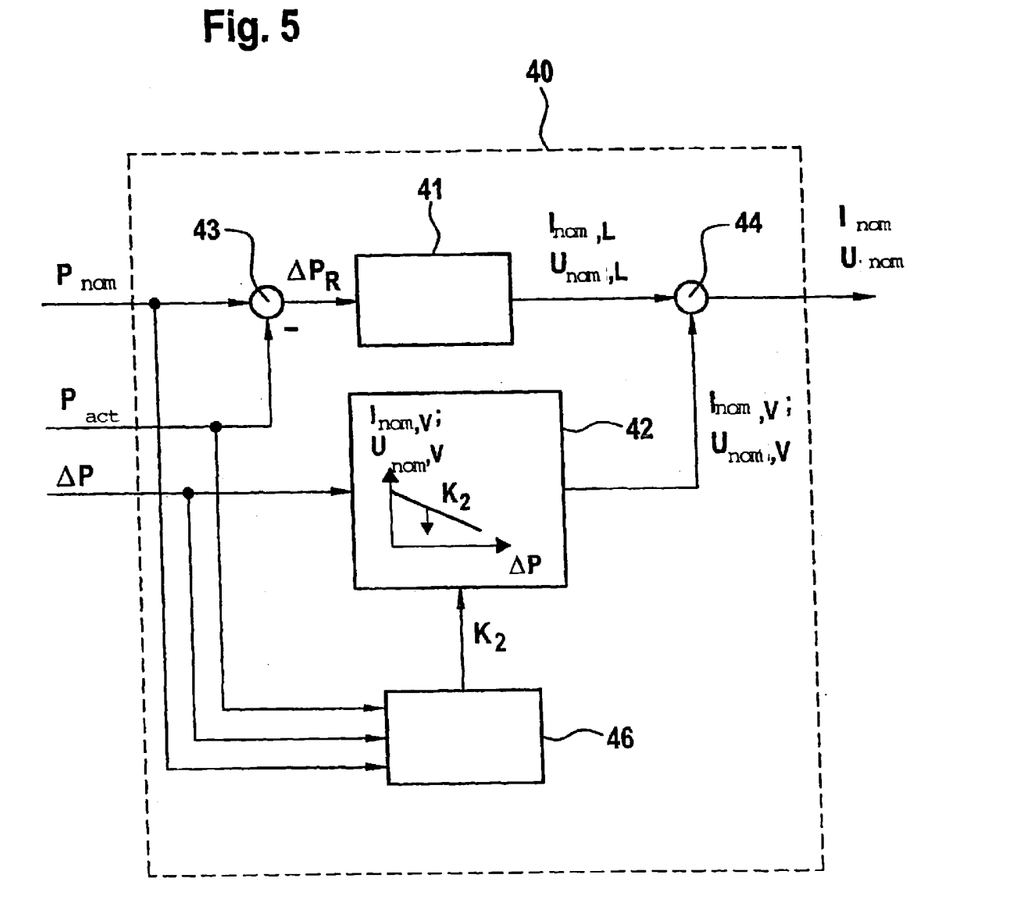
FIG. 5 shows the design of a pressure controller for implementing the second mentioned method of the invention.
Figure 6:
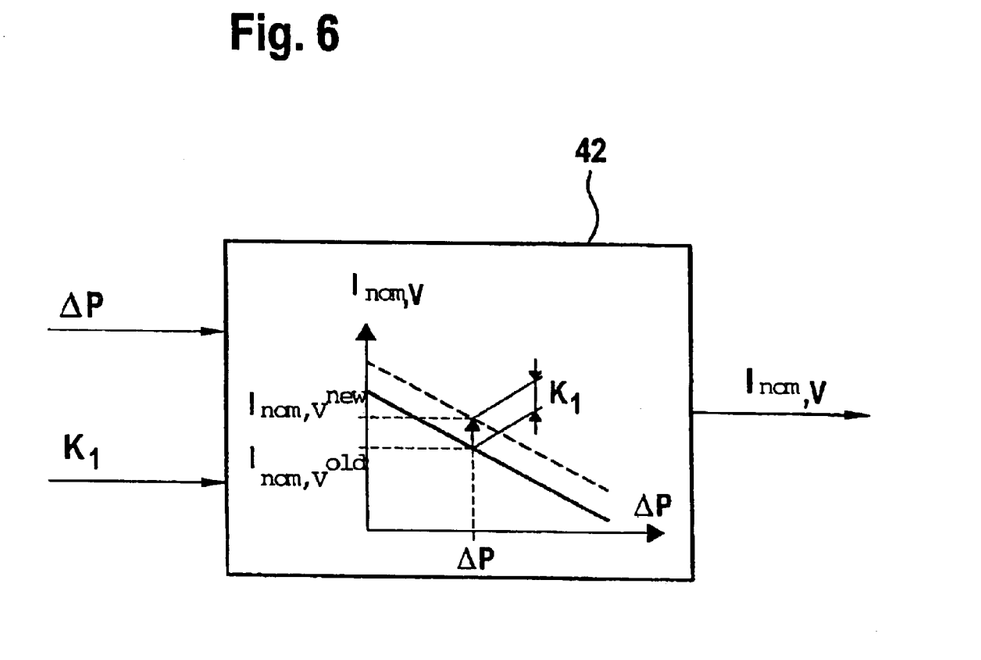
FIG. 6 depicts the function of the pilot control module shown in FIG. 4.

In FIGS. 4 to 6, a pressure controller for implementing the method of the invention is illustrated. The illustrated pressure controller 40, which is a component part of the above-mentioned electronic control unit 32, is furnished with signals as input quantities that represent the nominal pressure value $P_{nom}$, that shall be applied to one of the wheel brakes 7,8, the actual pressure value $P_{act}$, that is applied to one of the wheel brakes 7,8, as well as the differential pressure $\Delta p$ applied to the corresponding pressure control valve. The output quantity of the pressure controller 40 represents the nominal value $I_{nom}$ or $U_{nom}$ of the electric current to be supplied to the electromagnetically controllable pressure control valve or, respectively, the voltage to be applied to the pressure control valve that can be driven piezoelectrically.

The pressure controller illustrated in FIGS. 4 and 6 is especially suited for implementing the first method of the invention. As can be taken from the drawings, the above-mentioned pressure controller 40 generally comprises a linear controller 41, a pilot control module 42, and a correction module designated by reference numeral 45. As an input quantity of the linear controller 41, a deviation $\Delta P_R$ is used which is produced in a subtractor 43 connected upstream of the linear controller 41 from the nominal pressure value $P_{nom}$ and the actual pressure value $P_{act}$, while in an adder 44 the output quantity $I_{nom, V}$ or $U_{nom, V}$ of the pilot control module 42 is added to the output quantity $I_{nom, L}$ or $U_{nom, L}$ of the linear controller 41. The above-mentioned signals $P_{act}$ and $\Delta P$ are processed in the correction module 45 to a correction quantity $K_1$ influencing the behavior of the pilot control module 42 in the sense of the correction or adaption described hereinabove. The effect of the correction variable $K_1$ is an adaption of the pilot control characteristic curve $I_{nom, V}$ or $U_{nom, V}$ stored in the pilot control module 42 to the valve performance observed, as is indicated by the vertically pointing arrow. As shows FIG. 6 by way of the example of an electromagnetically controllable pressure control valve, the pilot control characteristic curve $I_{nom, V}=f(\Delta p)$ is shifted 'in an upward direction' by the value of the correction variable $K_1$, i.e., to higher current values.

The pressure controllers illustrated in FIG. 5 is especially well suited for implementing the second method of the invention. As can be taken from the drawing, its design generally corresponds to the pressure controller described in connection with FIGS. 4 and 6. In its correction module 46, however, the nominal pressure value $P_{nom}$, the actual pressure value $P_{act}$ as well as the differential pressure $\Delta P$ applied to the pressure control valve being identified are processed to achieve a correction variable $K_2$ which effects a reduction of the pilot control characteristic curve in case of need, as is indicated by the arrow pointing in a downward direction.

What is claimed is:

1. Method for controlling an electronically controllable brake actuating system for automotive vehicles, said brake actuating system of the type including a depressurized pressure medium supply reservoir, with at least one pressure source controlled by an electronic control unit, said pressure source being used to apply pressure to the wheel brakes of the vehicle, with pressure sensors and pressure control valves being associated with said wheel brakes, said pressure control valves being controllable in an analog manner by means of an electric variable in dependence on the differential pressure applied to them and connecting the wheel brakes to the pressure source in a pressure increase phase, being closed or becoming closed in a pressure maintenance phase and connecting the wheel brakes to the pressure medium supply reservoir in a pressure reduction phase, comprising the step of:

identifying the presence of a pressure maintenance phase, then, slowly varying the electric variable in the pressure control valve until a predetermined pressure variation takes place in the wheel brake associated with said pressure control valve, whereupon the dependence of the electric variable on the differential pressure is corrected, further including the step of observing cyclically in a time window the pressure variation in the wheel brake associated with the pressure control valve during the variation of the electric variable, and determining the minimum pressure value in each case which, in turn, is taken into account for determining a detection threshold for the pressure change at the inlet of the pressure control valve used for pressure reduction.

2. Method as claimed in claim 1, wherein the pressure control valves (inlet valve 17, 18; outlet valve 27,28) are designed as valves that are closed in their inactive condition, and further including the step of:

increasing the variation of the electric actuating variable based on a value that is below the value necessary for opening the pressure control valve.

3. Method as claimed in claim 1 wherein the pressure control valves used for pressure reduction are designed as valves that are normally open in their inactive condition, and wherein the varying step further includes reducing the electric actuator variable based on a value that is above the value necessary for retaining the pressure control valve in the closed condition.

4. Method as claimed in claim 1, further including the step of varying the electric variable in defined driving situations.

5. Method as claimed in claim 1, further including the step of varying the electric variable during vehicle standstill or in a defined range of the vehicle speed.

6. Method as claimed in claim 1, further including the step of varying the electric variable at a low variation speed of a braking pressure nominal value.

7. Method as claimed in claim 1, further including the step of varying the electric variable after a minimum duration of the pressure maintenance phase.

8. Method as claimed in claim 1, further including the step of discontinuing the electric actuation variable when the difference between nominal pressure and actual pressure exceeds a predetermined tolerance range.

9. Method as claimed in claim 8, further including the step of fixing the limits of the tolerance range in dependence on the vehicle speed.

10. Method as claimed in claim 1, wherein the pressure control valves are designed as electromagnetically controllable valves, and in that the electric variable is an electric current being supplied to the electromagnetic drive.

11. Method as claimed in claim 1, wherein the pressure control valves are configured as piezoelectrically controllable valves, and wherein the electric variable is an electric voltage applied to the piezoelectrically controllable valves.

12. Method as claimed in claim 1, further including the step of observing cyclically in a time window the pressure variation in the wheel brake associated with the pressure control valve during the variation of the electric variable determining and the maximum pressure value in each case which, in turn, is taken into account for determining a detection threshold for the pressure change at the outlet of the pressure control valve used for pressure increase.

13. Method as claimed in claim 12, wherein a detection threshold E in the window i is defined according to the formula $$E = \text{Max}(p)|\text{window } (i-1) + \epsilon,$$

where $\epsilon$ is a process parameter taking into account valve leakage and malfunctions of the pressure sensor sensing the pressure variation.

14. Method as claimed in claim 13, wherein the opening of the pressure control valve is inferred when the pressure value at the outlet of the pressure control valve exceeds the detection threshold (E) in the time window (i).

15. Method as claimed in claim 1, wherein a detection threshold E in the window i is defined according to the formula $$E = \text{Max}(p)|\text{window } (i-1) - \epsilon,$$

where $\epsilon$ is a process parameter taking into account valve leakage and malfunctions of the pressure sensor sensing the pressure variation.

16. Method as claimed in claim 15, wherein opening of the pressure control valve is inferred when the pressure value at the inlet of the pressure control valve drops below the detection threshold (E) in the time window (i).

17. Method as claimed in any one of claims 12, wherein at time ($t_{detect}$), when the pressure value at the outlet of the pressure control valve used for pressure increase or at the inlet of the pressure control valve used for pressure reduction exceeds or falls below the detection threshold (E), a point of time is calculated according to the formula $$t_{react} = t_{detect} - \tau$$

where $\tau$ designates the offset in time between the reaction of the pressure control valve caused by the actuation and the detection of this reaction by way of the change in pressure.

18. Method as claimed in claim 17, wherein the offset in time ($\tau$) is determined in dependence on a signal characterizing the viscosity of the pressure medium.

19. Method as claimed in claim 10, wherein the dependence of the actuating current I(Δp) on the differential pressure (Δp) is corrected according to the formula $$I(\Delta p)^{new} = I(\Delta p)^{old} \cdot (1-\lambda) + \lambda \cdot I_{react},$$

where $I_{react}$ designates the actuating current value corresponding to the change in pressure in the wheel brake associated with the pressure control valve at time ($t_{react}$), $I(\Delta p)^{old}$ designates the value of the dependence of the actuating current I(Δp) on the differential pressure (Δp) in the present operating point (Δp) before the correction (adaption) is carried out, and $I(\Delta p)^{new}$ designates the value of the dependence of the actuating current I(Δp) on the differential pressure (Δp) after the correction (adaption) is carried out, and the adaption rate λ should be selected from the interval (0, 1).

20. Method as claimed in claim 11, wherein the dependence of the voltage U(Δp) being applied on the differential pressure (Δp) is corrected according to the formula $$U(\Delta p)^{new} = U(\Delta p)^{old} \cdot (1-\lambda) + \lambda \cdot U_{react},$$

where $U_{react}$ designates the actuating voltage value corresponding to the change in pressure in the wheel brake associated with the pressure control valve at time ($t_{react}$), $U(\Delta p)^{old}$ designates the value of the dependence of the actuating voltage U(Δp) on the differential pressure (Δp) in the present operating point (Δp) before the correction (adaption) is carried out, and $U(\Delta p)^{new}$ designates the value of the dependence of the actuating voltage U(Δp) on the differential pressure (Δp) after the correction (adaption) is carried out, and the adaption rate λ shall be selected from the interval (0, 1).

21. Method for controlling an electronically controllable brake actuating system for automotive vehicles, with a depressurized pressure medium supply reservoir, with at least one pressure source which can be controlled by an electronic control unit, said pressure source being used to apply pressure to the wheel brakes of the vehicle, with pressure control valves being associated with said wheel brakes, said pressure control valves being controllable in an analog manner by means of an electric variable in dependence on the differential pressure applied to them and connecting the wheel brakes to the pressure source in a pressure increase phase, being closed or becoming closed in a pressure maintenance phase, and connecting the wheel brakes to the pressure medium supply reservoir in a pressure reduction phase, comprising the steps of:

determining a frequency of the actuation processes of the pressure control valves and considering said frequency according to a nominal pressure variation to be controlled in the wheel brakes for the correction of the dependence of the electric variable on the differential pressure, determining the number of the actuation processes of the pressure control valve used for pressure reduction during a pressure increase phase of the nominal pressure variation of the duration, and inferring that an excessive actuation of the pressure control valve used for pressure increase from the exceeding of a threshold value comparing the number determined ($N_{red}$, $N_{incr}$) to a maximum allowed numerical value ($N_{red}^*$, $N_{incr}^*$) that is produced according to the formula $$N_{red}^* = f_a \cdot T_{incr} \text{ or } N_{incr}^* = f_a \cdot T_{red}$$

where $f_a$ maximum allowed actuation frequency and $T_{incr}$, $T_{red}$ designates the duration of the phase of rise or fall of the pressure, and in that an excessive actuation of the pressure control valve used for pressure increase or reduction is inferred from the exceeding of the maximum allowed numerical value ($N_{red}^*$, $N_{incr}^*$).

22. Method as claimed in claim 21, further including the step of:

comparing the number of the actuation processes of the pressure control valve used for pressure increase during a pressure reduction phase of the nominal pressure variation of the duration, and inferring that an excessive actuation of the pressure control valve used for pressure reduction from the exceeding of a threshold value.

23. Method as claimed in claim 21, wherein the pressure control valves are designed as electromagnetically controllable valves, and in that the electric variable is an electric current being supplied to the electromagnetic drive.

24. Method as claimed in claim 21, wherein the pressure control valves are configured as piezoelectrically controllable valves, and in that the electric variable is an electric voltage being applied to the piezoelectrically controllable valves.

25. Method as claimed in claim 21, wherein the correction of the dependence of the actuating current I(Δp) on the differential pressure (Δp) is carried out according to the formula $$I(\Delta p)^{new} = I(\Delta p)^{old} - \Delta I,$$

where $I(\Delta p)^{old}$ designates the value of the dependence of the actuating current I(Δp) on the differential pressure (Δp) in the present operating point (Δp) before the correction (reduction) is carried out, and $I(\Delta p)^{new}$ designates the value of the dependence of the actuating current I(Δp) on the differential pressure (Δp) after the correction (reduction) is carried out.

26. Method as claimed in claim 21, wherein the correction of the dependence of the voltage U(Δp) to be applied on the differential pressure (Δp) is carried out according to the formula $$U(\Delta p)^{new} = U(\Delta p)^{old} - \Delta U,$$

where $U(\Delta p)^{old}$ designates the value of the dependence of the actuating voltage U(Δp) on the differential pressure (Δp) in the present operating point (Δp) before the correction (reduction) is carried out, and $U(\Delta p)^{new}$ designates the value of the dependence of the actuating voltage U(Δp) on the differential pressure (Δp) after the correction (reduction) is carried out.

27. An electronically controllable brake actuating system, comprising:

a pressure controller having as input quantities, a nominal pressure value that shall be applied to one of the wheel brakes of the vehicle, an actual pressure value that is applied to one of the wheel brakes of the vehicle, a hydraulic differential pressure value disposed at a pressure control valve under review and having an output quantity that is the nominal value of an electric variable used to actuate the pressure control valve, and means for correcting the dependence on the electric variable on the differential pressure value, wherein the pressure controller further includes a linear controller, a pilot control module, and a correction module, and the deviation produced from the nominal pressure value and actual pressure value is sent to the linear controller as an input quantity, while a signal representative of the hydraulic differential pressure prevailing at the pressure control valve under review is sent to the pilot control module, with said pilot control module generating a pilot control value of the electric variable used to actuate the pressure control valve that corresponds to the opening point of the pressure control valve and is added to the output quantity of the linear controller for producing the nominal value of the electric variable used to actuate the pressure control valve, and with the actual pressure value and the differential pressure prevailing at the pressure control valve under review being sent as input quantities to the correction module and the output quantity influencing the performance of the pilot control module.

28. Control system as claimed in claim 27 quantity $K_1$ of the correction module is defined as:

wherein the output quantity ($K_1$) of the correction module (45) is defined as a difference:

$$K_1 = I(\Delta p)^{new} - I(\Delta p)^{old}$$

or $$K_1 = U(\Delta p)^{new} - U(\Delta p)^{old}$$

where $I(\Delta p)$ or $U(\Delta p)^{old}$ designates the value of the dependence of the electric actuation variable $I(\Delta p)$ or $U(\Delta p)$ on the differential pressure ($\Delta p$) in the present operating point ($\Delta p$) before the correction (adaption) is carried out, and $I(\Delta p)^{new}$ or $U(\Delta p)^{new}$ designates the value of the dependence of the electric actuation variable $I(\Delta p)$ or $U(\Delta p)$ on the differential pressure ($\Delta p$) after the correction (adaption) is carried out.

29. Control system as claimed in claim 27, wherein that the nominal pressure value ($P_{nom}$) is additionally sent as an input quantity to the correction module, and in that its output quantity $K_2 = -\Delta I$ is derived from the comparison of the detected number of the actuation processes ($N_{red}$, $N_{incr}$) with a maximum allowed numerical value ($N_{red}^*$, $N_{incr}^*$), and the dependence of the electric variable is reduced when the maximum allowed numerical value $N_{red}^*$, $N_{incr}^*$) is exceeded.

30. Method for controlling an electronically controllable brake actuating system for automotive vehicles, said brake actuating system of the type including a depressurized pressure medium supply reservoir, with at least one pressure source controlled by an electronic control unit, said pressure source being used to apply pressure to the wheel brakes of the vehicle, with pressure sensors and pressure control valves being associated with said wheel brakes, said pressure control valves being controllable in an analog manner by means of an electric variable in dependence on the differential pressure applied to them and connecting the wheel brakes to the pressure source in a pressure increase phase, being closed or becoming closed in a pressure maintenance phase and connecting the wheel brakes to the pressure medium supply reservoir in a pressure reduction phase, comprising the step of:

identifying the presence of a pressure maintenance phase, then, slowly varying the electric variable in the pressure control valve until a predetermined pressure variation takes place in the wheel brake associated with said pressure control valve, whereupon the dependence of the electric variable on the differential pressure is corrected, wherein the pressure control valves are designed as electromagnetically controllable valves, and in that the electric variable is an electric current being supplied to the electromagnetic drive, wherein the dependence of the voltage $U(\Delta p)$ being applied on the differential pressure ($\Delta p$) is corrected according to the formula $$U(\Delta p)^{new} = U(\Delta p)^{old} \cdot (1-\lambda) + \lambda \cdot U_{react},$$

where $U_{react}$ designates the actuating voltage value corresponding to the change in pressure in the wheel brake associated with the pressure control valve at time ($t_{react}$), $U(\Delta p)^{old}$ designates the value of the dependence of the actuating voltage $U(\Delta p)$ on the differential pressure ($\Delta p$) in the present operating point ($\Delta p$) before the correction (adaption) is carried out, and $U(\Delta p)^{new}$ designates the value of the dependence of the actuating voltage $U(\Delta p)$ on the differential pressure ($\Delta p$) after the correction (adaption) is carried out and the adaption rate $\lambda$ shall be selected from the interval (0, 1).

31. Method for controlling an electronically controllable brake actuating system for automotive vehicles, said brake actuating system of the type including a depressurized pressure medium supply reservoir, with at least one pressure source controlled by an electronic control unit, said pressure source being used to apply pressure to the wheel brakes of the vehicle with pressure sensors and pressure control valves being associated with said wheel brakes, said pressure control valves being controllable in an analog manner by means of an electric variable in dependence on the differential pressure applied to them and connecting the wheel brakes to the pressure source in a pressure increase phase, being closed or becoming closed in a pressure maintenance phase and connecting the wheel brakes to the pressure medium supply reservoir in a pressure reduction phase, comprising the step of:

identifying the presence of a pressure maintenance phase, then, slowly varying the electric variable in the pressure control valve until a predetermined pressure variation rakes place in the wheel brake associated with said pressure control valve, whereupon the dependence of the electric variable on the differential pressure is corrected, wherein the pressure control valves are configured as piezoelectrically controllable valves, and wherein the electric variable is an electric voltage applied to the piezoelectric drive, wherein the dependence of the voltage $U(\Delta p)$ being applied on the differential pressure ($\Delta p$) is corrected according to the formula $$U(\Delta p)^{new} = U(\Delta p)^{old} \cdot (1-\lambda) + \lambda \cdot U_{react},$$

where $U_{react}$ designates the actuating voltage value corresponding to the change in pressure in the wheel brake associated with the pressure control valve at time ($t_{react}$), $U(\Delta p)^{old}$ designates the value of the dependence of the actuating voltage $U(\Delta p)$ on the differential pressure ($\Delta p$) in the present operating point ($\Delta p$) before the correction (adaption) is carried out and $U(\Delta p)^{new}$ designates the value of the dependence of the actuating voltage $U(\Delta p)$ on the differential pressure ($\Delta p$) after the correction (adaption) is carried out, and the adaption rate $\lambda$ shall be selected from the interval (0, 1).

32. Method for controlling an electronically controllable brake actuating system for automotive vehicles, said brake actuating system of the type including a depressurized pressure medium supply reservoir, with at least one pressure source controlled by an electronic control unit, said pressure source being used to apply pressure to the wheel brakes of the vehicle, with pressure sensors and pressure control valves being associated with said wheel brakes, said pressure control valves being controllable in an analog manner by means of an electric variable in dependence on the differential pressure applied to them and connecting the wheel brakes to the pressure source in a pressure increase phase, being closed or becoming closed in a pressure maintenance phase and connecting the wheel brakes to the pressure medium supply reservoir in a pressure reduction phase, comprising the step of:

identifying the presence of a pressure maintenance phase, then, slowly varying the electric variable in the pressure control valve until a predetermined pressure variation takes place in the wheel brake associated with said pressure control valve, whereupon the dependence of the electric variable on the differential pressure is corrected, wherein a detection threshold E in the window 1 is defined according to the formula $$E = \mathrm{Max}(p)|\mathrm{window}\ (i-1) + \epsilon,$$

where $\epsilon$ is a process parameter taking into account valve leakage and malfunctions of the pressure sensor sensing the pressure variation, wherein the opening of the pressure control valve is inferred when the pressure value at the outlet of the pressure control valve exceeds the detection threshold (E) in the time window (i).

33. Method for controlling an electronically controllable brake actuating system for automotive vehicles, said brake actuating system of the type including a depressurized pressure medium supply reservoir, with at least one pressure source controlled by an electronic control unit, said pressure source being used to apply pressure to the wheel brakes of the vehicle, with pressure sensors and pressure control valves being associated with said wheel brakes, said pressure control valves being controllable in an analog manner by means of an electric variable in dependence on the differential pressure applied to thorn and connecting the wheel brakes to the pressure source in a pressure increase phase, being closed or becoming closed in a pressure maintenance phase and connecting the wheel brakes to the pressure medium supply reservoir in a pressure reduction phase, comprising the step of:

identifying the presence of a pressure maintenance phase, then, slowly varying the electric variable in the pressure control valve with a predetermined pressure variation takes place in the wheel brake associated with said pressure control valve, whereupon the dependence of the electric variable on the differential pressure is corrected, wherein at time ($t_{detect}$), when the pressure value at the outlet of the pressure control valve used for pressure increase or at the inlet of the pressure control valve used for pressure reduction exceeds or falls below the detection threshold (E), a point of time is calculated according to the formula $$t_{react} = t_{detect} - \tau$$

where $\tau$ designates the offset in time between the reaction of the pressure control valve caused by the actuation and the detection of this reaction by way of the change in pressure, wherein the offset in time ($\tau$) is determined in dependence on a signal characterizing the viscosity of the pressure medium.

* * * * *